July 2, 1935.  C. R. LINDSEY  2,006,506
AUTOMOBILE SEAT CONSTRUCTION
Filed April 12, 1934   2 Sheets-Sheet 1
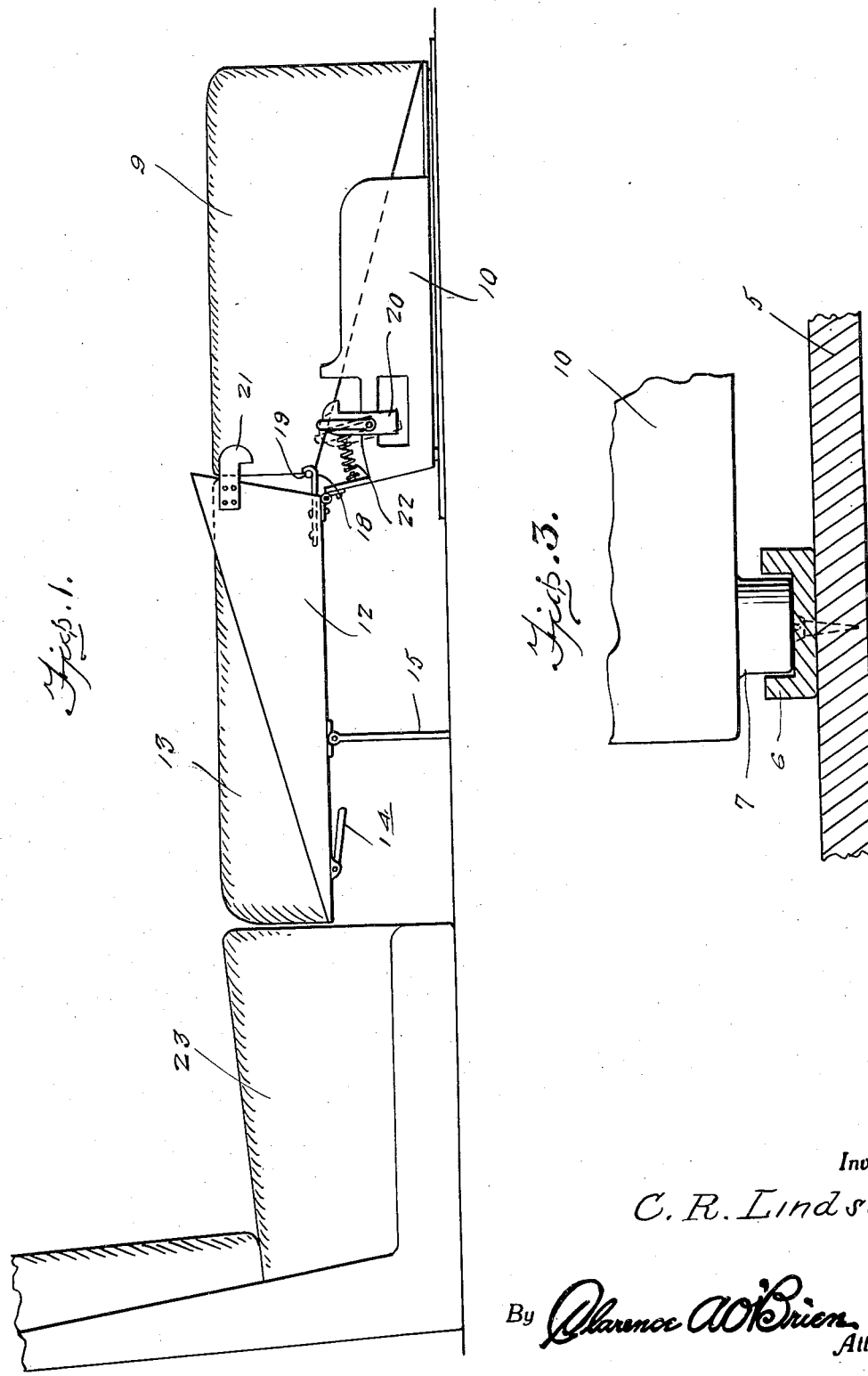
Inventor
C. R. Lindsey
By Clarence A. O'Brien
Attorney July 2, 1935.  C. R. LINDSEY  2,006,506
AUTOMOBILE SEAT CONSTRUCTION
Filed April 12, 1934   2 Sheets-Sheet 2
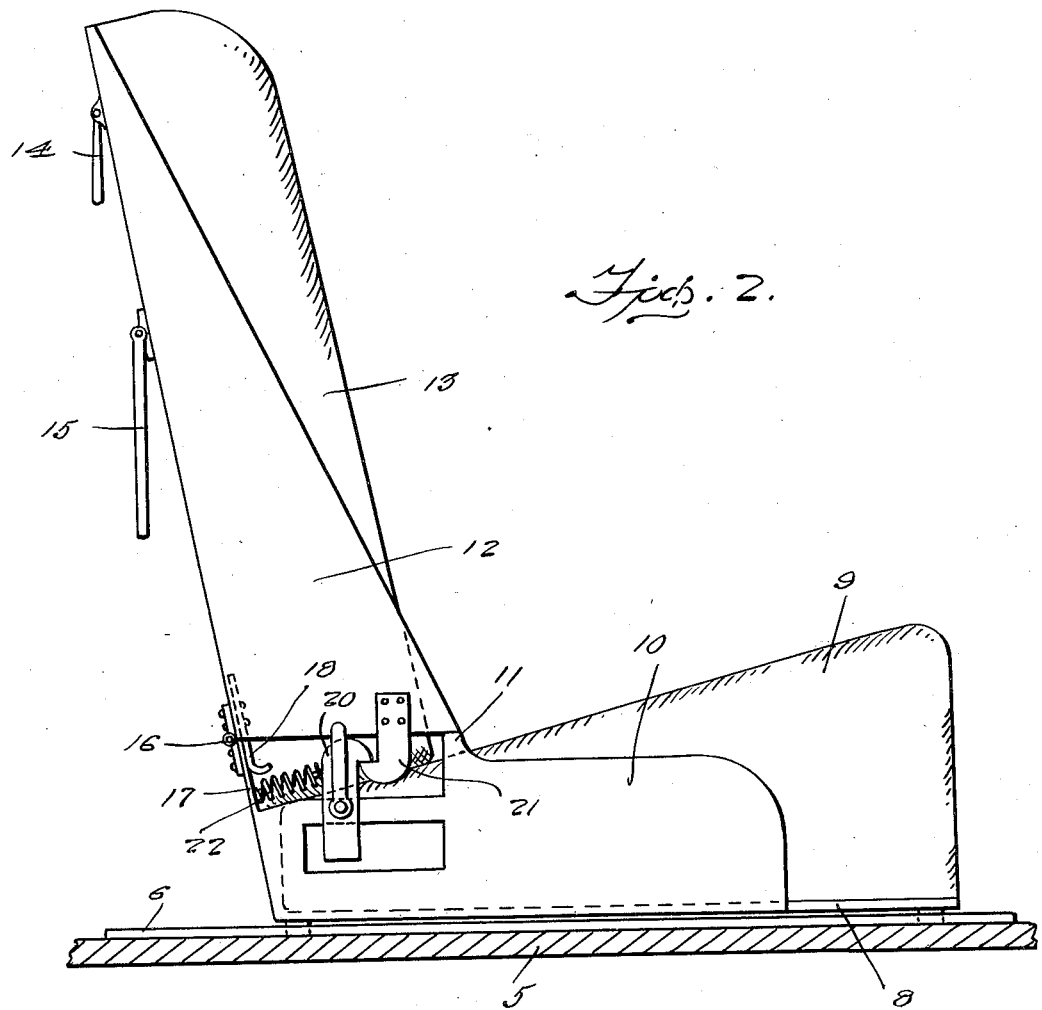
Inventor
C. R. Lindsey
By 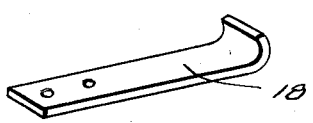
Attorney Patented July 2, 1935

2,006,506

UNITED STATES PATENT OFFICE 2,006,506

AUTOMOBILE SEAT CONSTRUCTION

Clyde Russell Lindsey, Metropolis, Ill.

Application April 12, 1934, Serial No. 720,316

1 Claim. (Cl. 155—7)

This invention appertains to new and useful improvements in seat constructions for automobiles, and more particularly to a novel seating arrangement whereby the usual front seat back can be brought to a reclining position so as to contribute to the front and rear seats an intermediate section defining a lounge or bed suitable to sleep upon.

An important object of the present invention is to provide a novel front seat construction for automobiles wherein the back of the front seat is capable of being swung backwardly and the front seat tilted upwardly so that the top surfaces of the seats and front seat back will be on substantially the same plane when the parts are disposed to form a bed.

Other important objects and advantages of the invention will become apparent to the reader of the following specification.

In the drawings:

Figure 1 represents a side elevational view of the seating arrangement, with the parts disposed to form a bed.

Figure 2 represents a side elevational view of the front seat structure.

Figure 3 represents a fragmentary detailed enlarged view showing the guide means for the front seat.

Figure 4 represents a perspective view of one of the front seat keepers.

Figure 5 represents a perspective view of one of the hooks for the front seat back.

Referring to the drawings wherein like numerals designate like parts, it can be seen in Figure 2 that numeral 5 represents the floor of the automobile body upon which is mounted a pair of channeled guide members 6 for receiving the stub legs or studs 7 on the bottom of the front seat section 8, upon which the front seat cushion is disposed. The front seat 8 includes side walls 10, each being provided with an upstanding portion 11 upon which a corresponding side portion 12 of the front seat back engages. The front seat back is provided with the usual upholstering 13 and the back side of the seat back is provided with the usual robe rack 14, while swingably connected to the back side of the seat back are pivotal leg members 15 which support the back at a point above the floor of the automobile when the back is in reclining position.

As is clearly shown in Figure 2, the lower portion of the back 12 is hingedly connected, as at 16, to an upstanding portion 17 of the front seat 8 and at this point the seat back is provided with a pair of hook members 18 which will engage the pintles 19 at the rear end of the seat cushion 9 to support the rear end portion in elevated position, as in the manner shown in Figure 1, to the end that the upper surface of the cushion will be substantially flush with the top surface of the upholstery 13 when the seat back is in reclined position. Each of the side walls 10 of the front seat is provided with a swingable latch member 20, the hook end of which is engageable with the stationary hook or keeper 21 on the corresponding side of the seat back 12. A spring 22 is interposed between the catch 20 and the upstanding portion 17 of the front seat 8 so as to normally maintain the catch 20 engaged with the keeper 21.

Obviously, in reclining the seat back, the catches 20 are disengaged from the keepers 21 and the seat back is swung backwardly until it is interposed between the rear end of the cushion 9 and the forward side of the rear seat cushion 23.

The rear end of the front seat cushion 9 is now elevated so that the pintles 19 will rest upon the hooks 18 and the front seat 8 is now slid backwardly on its guides 6 so that the front seat back will be interposed snugly between the cushions 9 and 23.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

A seating arrangement for automobiles including front and rear seats, said front seat being liftable; a base structure for the front seat, said base structure being provided with an upstanding portion, a swingable latch member on the base provided with a hook end, a spring interposed between the said latch member and the upstanding portion for projecting the hook end of the latch member forwardly, a back for the seat, a hinged connection between the back and the upstanding portion of the base, and a hook member on the back for engagement with the spring projected latch member on the base for retaining the said back in upright position, said front seat being provided with laterally projecting pintles, and hook members on the lower portion of the front seat back to engage said pintles and support the rear portion of the front seat elevated when the back thereof is in lowered position.

CLYDE RUSSELL LINDSEY.